Aug. 11, 1959 L. BREGUET 2,899,149
AIRCRAFT HAVING DUCTED TURBINE DRIVEN LIFT ROTORS
Filed Dec. 8, 1953 4 Sheets-Sheet 1
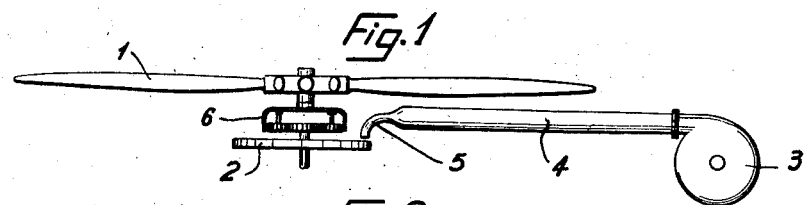
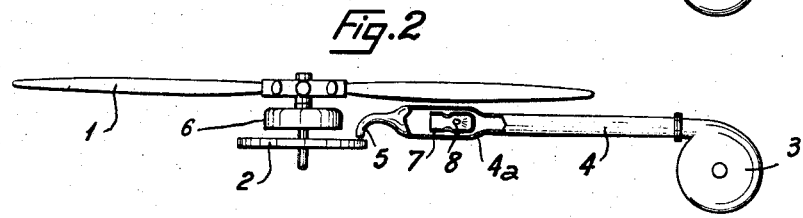
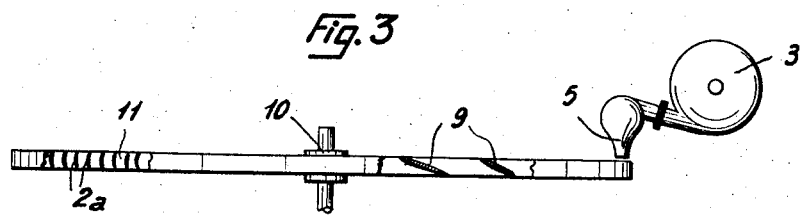
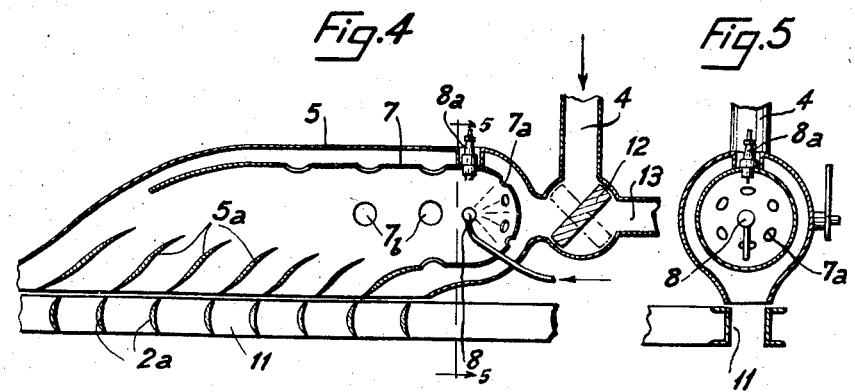
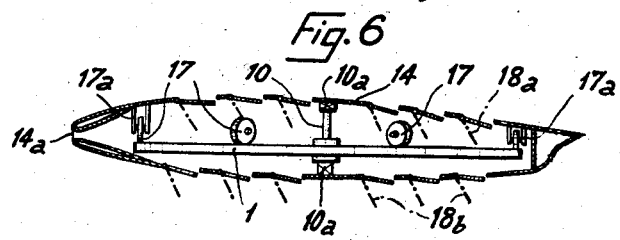

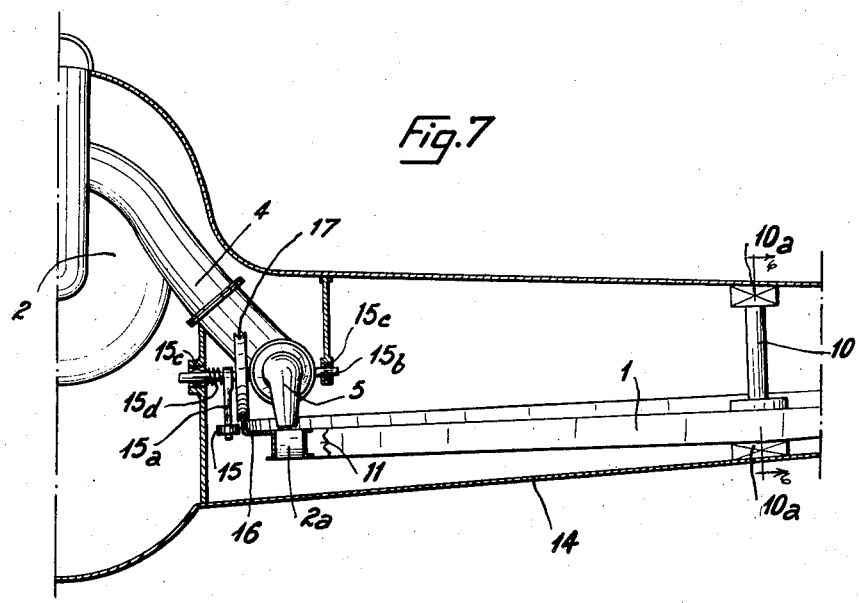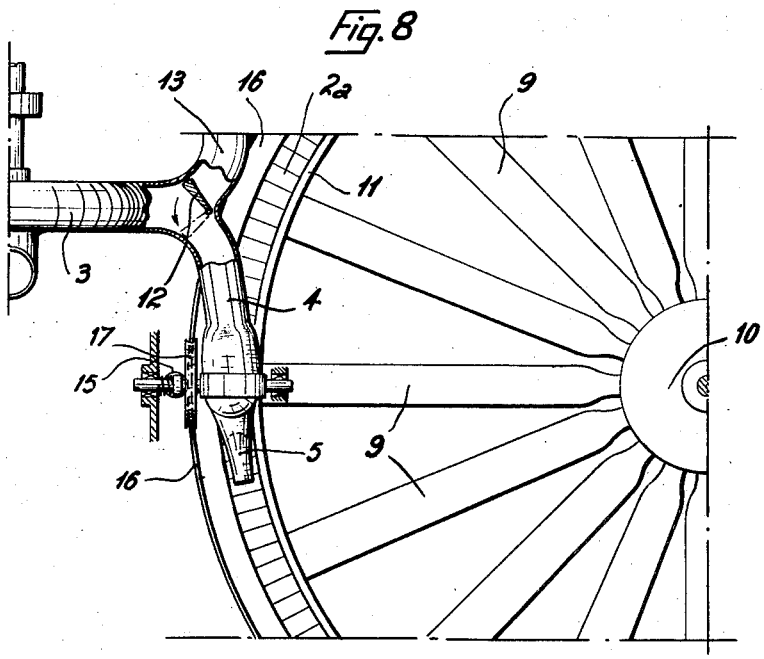

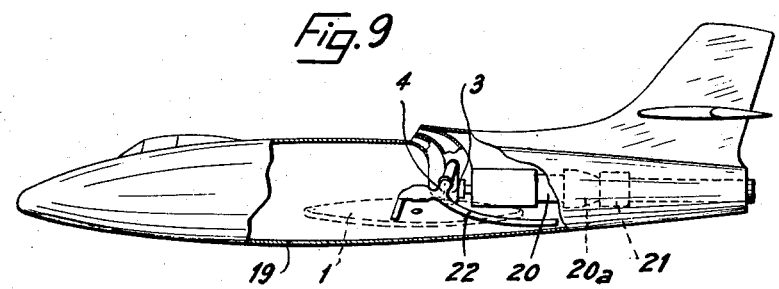
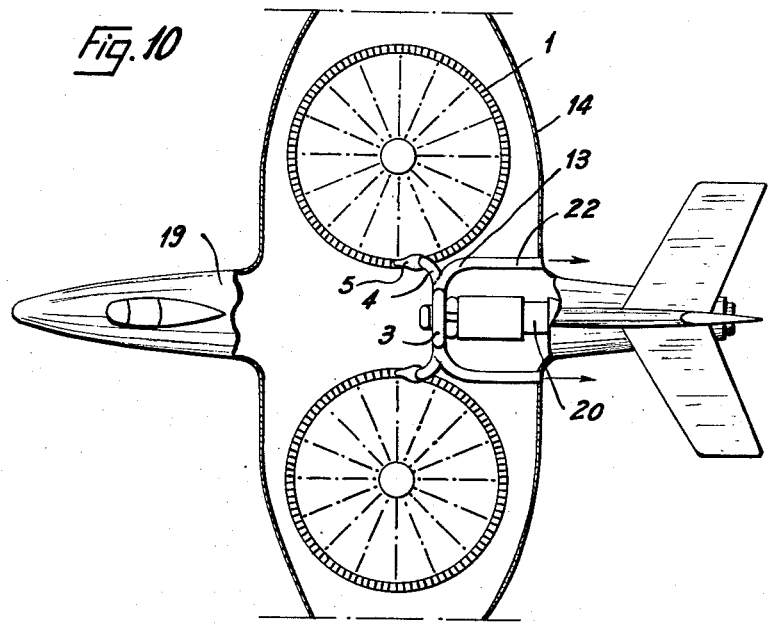
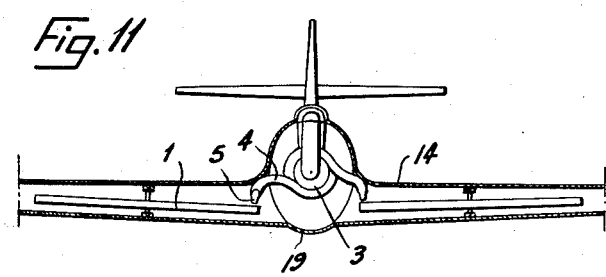

Aug. 11, 1959 L. BREGUET 2,899,149
AIRCRAFT HAVING DUCTED TURBINE DRIVEN LIFT ROTORS
Filed Dec. 8, 1953 4 Sheets-Sheet 4
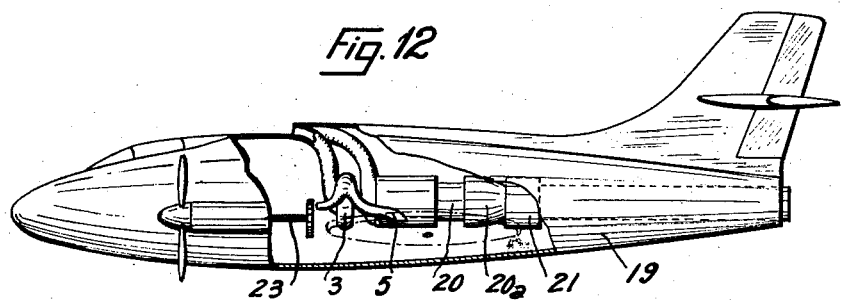
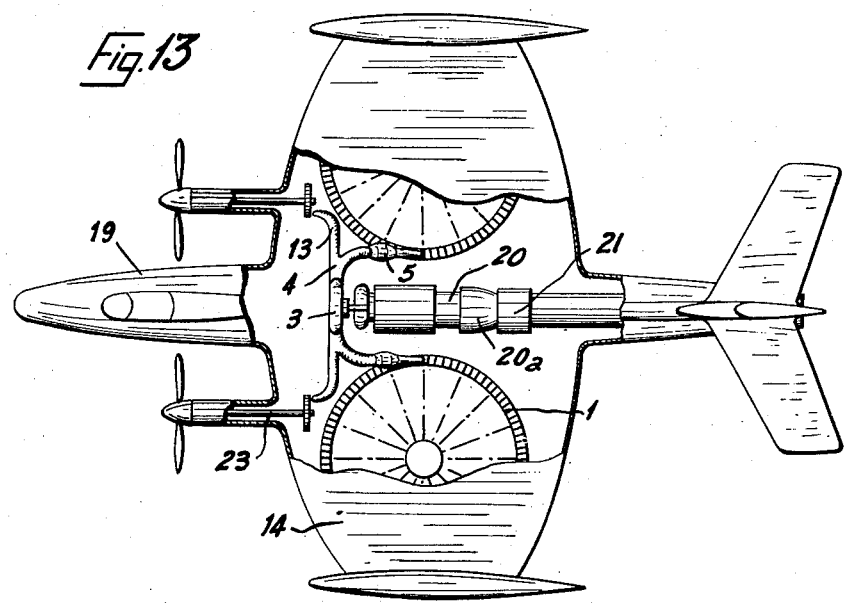
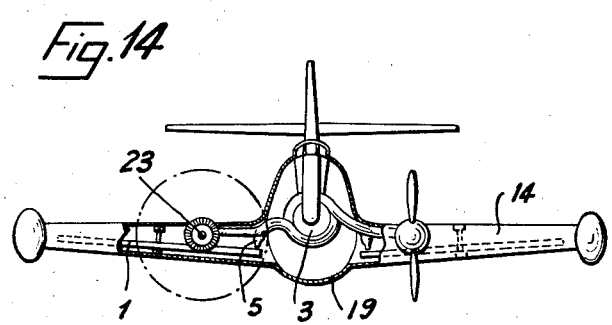

United States Patent Office 2,899,149
Patented Aug. 11, 1959

2,899,149

AIRCRAFT HAVING DUCTED TURBINE DRIVEN LIFT ROTORS

Louis Breguet, Paris, France; Claire J. Breguet, Antoine J. E. L. Breguet, Jacqueline Y. Breguet, Gilberte M. L. Breguet, Pierre E. L. Breguet, Paul G. R. L. Breguet; Pascal A. L. Breguet and Louis-Christian A. M. Breguet, under legal guardianship of Claire J. Breguet, sole heirs of Louis Breguet, deceased Application December 8, 1953, Serial No. 396,912

Claims priority, application France December 18, 1952

4 Claims. (Cl. 244—12)

It has already been proposed to provide on aircraft, and in particular aircraft powered by turbine engines, a separate compressor absorbing a large proportion of the available power of the engine and the air of which is utilised by expansion to supply a reactive thrust which is added to the normal propulsive effort.

By providing in this additional compressed-air flow, burners ignited either permanently or momentarily, for example for taking-off or when speed peaks or boosts are necessary, an increase in the kinetic energy and the reactive thrust of this flow is obtained owing to the increase of the speed due to the heating.

The true gain on the operating conditions of the aircraft which results from this additional reaction, however, depends essentially upon the relative speeds at the outlet orifice, which is a disadvantage.

The present invention permits of obviating this disadvantage.

According to the invention, in an airplane provided with wings the flow of a gas compressor is utilised, with or without heating, on the blades of a driven wheel driving a rotor mounted inside a wing and which provides, or assists in providing, the lift or the propulsion of the aircraft.

The description which follows with reference to the accompanying drawings, which are given by way of non-limitative example, will enable the manner in which the invention can be carried into effect to be readily understood, the features appearing both from the drawings and from the text naturally forming part of the said invention.

Figure 1 is a diagrammatic elevational view of a rotor and of the driving device thereof intended for mounting within an airplane wing.

Figure 2 is a similar view, in which the driving device comprises means for the combustion of the gas flow.

Figure 3 is a view, similar to the preceding views, of a rotor directly driven by the gas flow.

Figures 4 and 5 are diagrammatic sections, on a larger scale, taken in two different planes and showing the details of the blades and of the nozzles for the admission of the gas flow, Fig. 5 being taken along the line 5—5 of Fig. 4.

Figure 6 is a diagrammatic cross-sectional view of a wing containing a rotor, said section being taken along the line 6—6 of Fig. 7.

Figures 7 and 8 show in side view and in plan view respectively, the details of a rotor with its guide devices and driving devices.

Figures 9, 10 and 11 are three views at different angles of an aircraft having direct jet propulsion and equipped with rotors according to the invention, and Figures 12, 13 and 14 are views, corresponding to the three preceding views, of an aircraft having combined jet and screw propulsion.

In the embodiment illustrated in Figure 1, the lift rotor is driven by a driven blade wheel 2 actuated by the expansion of the compressed air supplied by the compressor 3, which air is led through a conduit 4 to a diffuser 5 disposed opposite the blades of the wheel 2.

The driven wheel 2 may be disposed in the immediate neighbourhood of the rotor 1 which, in the present example, it drives through a sun and planet reduction gear 6, whereby all bevel gearing and transmission shafts are avoided. Naturally, the rotor could be directly driven by the wheel.

As may be seen from Figure 2, the power at the driven unit could be considerably increased by providing means for heating the compressed air before it is expanded. For this purpose, the conduit 4 comprises a widened portion 4a in which is provided a combustion chamber 7 comprising one or more burners 8.

With the particular arrangement illustrated in Figure 3, no mechanical transmission is required. In this case, the driven blades 2a form a ring 2 disposed on the periphery of the lift rotor 1.

The rotor then consists of a large number of narrow vanes 9 mounted on a hub 10 and supporting an outer ring 11 on which the driven blades 2a are mounted. The vanes 9 absorb the centrifugal efforts and limit the deformation of the outer ring 11 so as to maintain the ring 2 in the neighbourhood of the diffusers 5 for the projection of the expanded air. The rotor is driven directly by the periphery. Under the best conditions of utilisation, for the power employed, the diameter of the rotor is reduced and in particular is much smaller than that of a rotor of a normal helicopter. The direct utilisation of the jet on the blades 2a situated on the periphery of the rotor, at high speeds of ejection (which may be of the order of 800 metres per second when an aftercombustion device is employed) enables the increase of the power by the heating of the air to be fully utilised.

As shown by Figures 4 and 5, the diffuser 5 disposed opposite the blades 2a contains the combustion chamber 7 provided with the burner or burners 8, the plug 8a and the holes 7a and 7b for the admission of primary and secondary air. The outlet duct of the diffuser comprises guide vanes 5a. A valve 12 is provided to direct the air either towards the diffuser or towards a conduit 13, the use of which will hereinafter be described.

As is shown in Figures 6 to 8, the rotor according to the invention is preferably mounted in an aircraft wing, which is possible by reason of its small dimensions in relation to the high thrusts (of the order of 500 kg./m.² of swept surface) which can be obtained.

The hub 10 of the rotor then turns freely in bearings 10a supported by the framework of the wing 14. In order to ensure correct relative positioning of the ring 2 and of the nozzle or diffuser 5, a double guide system is provided, which comprises on the one hand at least one radial roller 15 (Figure 7) mounted on a pin 15a supported by a rod 15b fast with the diffuser 5, which rod 15b is guided by collars 15c with the interposition of a return spring 15d, the roller 15 running on a peripheral ring 16 of the rotor and, on the other hand, rollers 17 running on the same ring, one of which turns on the rod 15b while the others (Figure 6) are mounted in forks 17a supported by the framework of the wing 14.

The rollers 17, which are situated at intervals along the periphery of the ring 16 by which the blades are bound, may be used to transmit to the framework of the aircraft the lift thrust generated by the rotor.

The hub 10 of the rotor is then preferably so mounted as to permit a number of differential movements in order that the outer ring 16 may have less displacement in relation to the rollers 17.

It is to be noted that in the arrangement described the injection takes place only on a very partial sector of the ring of blades 2a. The latter therefore are subjected to contact with the air at high temperature only during a very small fraction of each revolution and can be cooled during a considerably longer time. Therefore, the temperature of the air in the combustion chambers can be raised without difficulty and without danger of excessive heating of the blades and of the ring of the rotors.

As is shown in Figure 6, the wing 14 containing the rotor 1 may be provided with automatic or controlled louvres 18a and 18b, both on the upper surface (18a) and on the lower surface (18b), which louvres will be completely opened during hovering in order to allow the ambient air to pass vertically through the rotor.

On the other hand, during travel these louvres will be closed to ensure a correct profile permitting the highest speeds. It is also possible, in particular in the case of controlled louvres, to effect the closing differently with different alignments of the rotors, so as to vary the centre of lift of the latter and to ensure equilibrium of the aircraft during low-speed travel.

In the case of high-speed travel, when the lift is provided wholly by the aerofoil, the rotors, while turning, for example, with cold jets, that is to say without consumption of fuel at the burners, may be used for the propulsion by means of a reduced opening of the louvres 18b on the lower wing surface, the louvres 18a on the upper wing surface then being closed. In this case, the air circulating in the wing will enter, at the dynamic pressure of forward movement, through an air intake 14a formed in the wing tip (Figure 6) and will be directed over the rotor, whereby its pressure will be increased so that the ejection, through the louvres 18b on the lower wing surface, will take place at a speed higher than the speed of forward movement of the aircraft.

Figures 9 to 14 show how the invention may be applied to a jet-propelled aircraft.

The fuselage 19 of the aircraft contains the driving installation 20, the turbine 20a of which is succeeded by an auxiliary turbine 21 driving the separate compressor 3.

The rotors 1 are mounted in the wings 14 in the manner described with reference to Figures 6 to 8.

In this case, the supporting surface of the wings can normally provide the lift of the aircraft during travel and it will therefore be advantageous to provide for the use of the lift rotors only during part of the flight, for example for vertical climbing or for stationary lift or during landing.

The conduits 4 extending from the compressor 3 feed, according to requirement, the nozzles 5 of the rotors or the conduits 13 which permit the use of the compressed air for further assisting the propulsion either by direct reaction (nozzles 22, Figures 9 to 11) or by means of screw propellers 23 (Figures 12 to 14).

In both cases, it is possible to use part of the air flux to increase the manoeuvrability of the aircraft, by directing part of the compressed air to the tail unit in order to render the controls active during hovering.

It will be obvious that modifications may be made to the aircraft hereinbefore described, notably by substitution of equivalent technical means, without departing from the scope of the present invention.

What I claim is:

1. In an aircraft having a fuselage provided with wings the combination of lift rotors, mounted each inside one of said wings, respectively, a gas-compressor supported from said fuselage, a peripheral ring enclosing a plurality of driving-blades at the periphery of each lift-rotor, a gas discharge-nozzle associated with said driving blades and adapted to direct a jet towards said blades, piping means for connecting said compressor to said discharge-nozzles, means carried by each wing for ensuring correct relative position of the corresponding discharge-nozzle and ring, said means comprising a support for said nozzle and guide rollers adapted to roll on the outer periphery of said ring, a plurality of rollers rotatably supported from each wing above each ring and adapted to roll on same, means for enabling air displaced by each rotor to pass through the corresponding wing, said means comprising a plurality of hinged louvres in the upper surface of said wing, a plurality of hinged louvres in the lower surface of said wing, and means for varying the position of said louvres at will, in accordance with the condition of operation of said aircraft.

2. In a jet-propelled aircraft having a fuselage provided with wings, the combination of lift rotors, mounted each inside one of said wings, respectively, a gas-compressor supported from said fuselage, an outer ring enclosing a plurality of driving-blades at the periphery of each rotor, a gas discharge-nozzle associated with said driving-blades and adapted to direct a jet towards said blades, branched piping means for connecting each compressor to said discharge-nozzle and also to atmosphere at the trailing edge of each said wing, valve means in said branched piping means for directing the air from said compressor to said discharge-nozzle or to atmosphere at will, and means carried by each wing and associated with the said peripheral ring of the corresponding rotor for ensuring correct relative position of said discharge-nozzle with respect to said driving blades and to transmit the lift from said rotor to said aircraft wing, said means including a support for said nozzle and a plurality of rollers located above and adapted to roll on said ring.

3. In a jet-propelled aircraft as claimed in claim 2 and provided with a tail unit, means in said branched piping means for directing a portion of the air directed to the atmosphere on to the tail unit of the said aircraft, whereby the aerodynamic controls of said aircraft may be maintained operative at low or zero forward speeds.

4. In an aircraft having a fuselage provided with wings, the combination of lift rotors mounted each in each wing respectively in substantial parallelism with the plane of same; a jet propulsion motor supported from said fuselage; comprising a gas turbine and a compressor associated with and driven by said turbine; an outer ring enclosing a plurality of driving blades disposed round the periphery of each of said rotors, a gas discharge nozzle associated with said driving blades of each rotor and adapted to direct a jet towards said blades; means for enabling air to pass through said wings in the portion of same wherein said rotors are mounted, means for varying the direction of flow of said air with respect to the plane of said rotors; an assembly comprising a turbine-wheel and a propelling airscrew provided in each of said wings, discharge nozzles respectively associated with each said turbine-wheels, branched piping means for connecting said compressor to said discharge nozzles respectively and valve means in said piping means whereby the delivery of said compressor may be applied at will to said blade rings or turbine-wheels, to produce vertical or horizontal thrust respectively.

References Cited in the file of this patent

UNITED STATES PATENTS

| 1,471,764 | Wheeler | Oct. 23, 1923 |
| 1,769,487 | Boney | July 1, 1930 |
| 1,824,195 | Chillingworth | Sept. 22, 1931 |
| 1,922,167 | Leray | Aug. 15, 1933 |
| 1,923,973 | Gudorf et al. | Aug. 22, 1933 |
| 2,280,835 | Lysholm | Apr. 28, 1942 |
| 2,397,526 | Bonbright | Apr. 2, 1946 |
| 2,710,067 | Pesaro | June 7, 1955 |

FOREIGN PATENTS

| 340,351 | France | May 10, 1904 |